(12) United States Patent
Aybay et al.

(10) Patent No.: US 8,792,485 B1
(45) Date of Patent: **\*Jul. 29, 2014**

(54) METHODS AND APPARATUS FOR CHAINING ACCESS SWITCHES COUPLED TO A SWITCH FABRIC

(75) Inventors: Gunes Aybay, Los Altos, CA (US); Jean-Marc Frailong, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,210

(22) Filed: Feb. 27, 2012

Related U.S. Application Data

(63) Continuation of application No. 12/345,494, filed on Dec. 29, 2008, now Pat. No. 8,125,985.

(51) Int. Cl.
*H04L 12/66* (2006.01)
(52) U.S. Cl.
USPC ............ 370/359; 370/357; 370/351; 370/420
(58) Field of Classification Search
None
See application file for complete search history.

(56) References Cited

U.S. PATENT DOCUMENTS

| | | | |
|---|---|---|---|
| 6,246,692 B1 | 6/2001 | Dai et al. | |
| 6,868,082 B1 | 3/2005 | Allen, Jr. et al. | |
| 7,197,612 B1 | 3/2007 | Basu et al. | |
| 7,430,171 B2 | 9/2008 | Black et al. | |
| 2002/0181484 A1 * | 12/2002 | Aimoto | 370/413 |
| 2003/0117949 A1 | 6/2003 | Moller et al. | |
| 2004/0096222 A1 | 5/2004 | Cagenius | |
| 2004/0153849 A1 | 8/2004 | Tucker et al. | |
| 2004/0213151 A1 | 10/2004 | Willhite et al. | |
| 2005/0027881 A1 * | 2/2005 | Figueira et al. | 709/238 |
| 2005/0050243 A1 | 3/2005 | Clark | |
| 2005/0232261 A1 | 10/2005 | Wybenga et al. | |
| 2006/0005233 A1 * | 1/2006 | Kleinsteiber et al. | 726/4 |
| 2006/0106922 A1 | 5/2006 | Arregoces et al. | |
| 2006/0209836 A1 * | 9/2006 | Ke et al. | 370/392 |
| 2006/0222012 A1 | 10/2006 | Bhargava et al. | |
| 2007/0025380 A1 | 2/2007 | Amagai et al. | |
| 2007/0280253 A1 | 12/2007 | Rooholamini et al. | |
| 2008/0044181 A1 | 2/2008 | Sindhu | |
| 2008/0228781 A1 | 9/2008 | Chen et al. | |
| 2009/0059803 A1 * | 3/2009 | Phaltankar | 370/244 |
| 2009/0300211 A1 | 12/2009 | Gallagher et al. | |

OTHER PUBLICATIONS

Office Action mailed Apr. 13, 2010 for U.S. Appl. No. 12/345,494 (19 pages).
Final Office Action mailed Oct. 8, 2010 for U.S. Appl. No. 12/345,494 (22 pages).
Office Action mailed Mar. 8, 2011 for U.S. Appl. No. 12/345,494 (22 pages).

\* cited by examiner

*Primary Examiner* — Anez Ebrahim
(74) *Attorney, Agent, or Firm* — Cooley LLP

(57) ABSTRACT

In some embodiments, a system includes a first switch fabric device, a second switch fabric device, a first access switch operatively coupled to the first switch fabric device by a first cable, and a second access switch operatively coupled to the second switch fabric device by a second cable. The second access switch is operatively coupled to the first access switch by a third cable. The first access switch is configured to send data to the first switch fabric device via the first cable. The first access switch is configured to send data to the second switch fabric device via the third cable, the second access switch, and the second cable.

13 Claims, 10 Drawing Sheets

METHODS AND APPARATUS FOR CHAINING ACCESS SWITCHES COUPLED TO A SWITCH FABRIC

CROSS REFERENCE TO RELATED APPLICATION

This application is a continuation of U.S. patent application Ser. No. 12/345,494, filed on Dec. 29, 2008, entitled "Methods and Apparatus for Chaining Access Switches Coupled to a Switch Fabric," now U.S. Pat. No. 8,125,985, which is incorporated herein by reference in its entirety.

BACKGROUND

Embodiments described herein relate generally to switch fabrics and more particularly to access switches configured to send data to and receive data from switch fabrics.

Switch fabrics can be, for example, used to route data between multiple devices, such as access switches. Each access switch can be operatively coupled to the switch fabric and can control data input to and output from the switch fabric. In this manner, each access switch can send data to the switch fabric and receive data from the switch fabric.

The switch fabric is often disposed within a housing different from the housing of the access switches. In such a situation, a cable is typically used to physically and operatively couple each access switch to the switch fabric. In large applications having a large number of access switches, the number of cables between access switches and a switch fabric can become large and potentially unmanageable.

Moreover, in some applications each access switch can be coupled to more than a single switch fabric for redundancy and/or to increase the capacity of the switch fabric. In such an application, a separate cable can be used for each connection between an access switch and each switch fabric to which that access switch is coupled. For example, if two switch fabrics are used, the number of cables between the access switches and the switch fabrics doubles. Additionally, the number of access switches that can be coupled to a switch fabric can be limited by the number of ports of the switch fabric.

Thus, a need exists for an apparatus and method for expanding the number of access switches that can be connected to a switch fabric without increasing the number of physical connections to the switch fabric. Further, a need exists for an apparatus and method of decreasing the number of cables between access switches and a switch fabric.

SUMMARY

In some embodiments, a system includes a first switch fabric device, a second switch fabric device, a first access switch operatively coupled to the first switch fabric device by a first cable, and a second access switch operatively coupled to the second switch fabric device by a second cable. The second access switch is operatively coupled to the first access switch by a third cable. The first access switch is configured to send data to the first switch fabric device via the first cable. The first access switch is configured to send data to the second switch fabric device via the third cable, the second access switch, and the second cable.

DETAILED DESCRIPTION

Figure 1A:
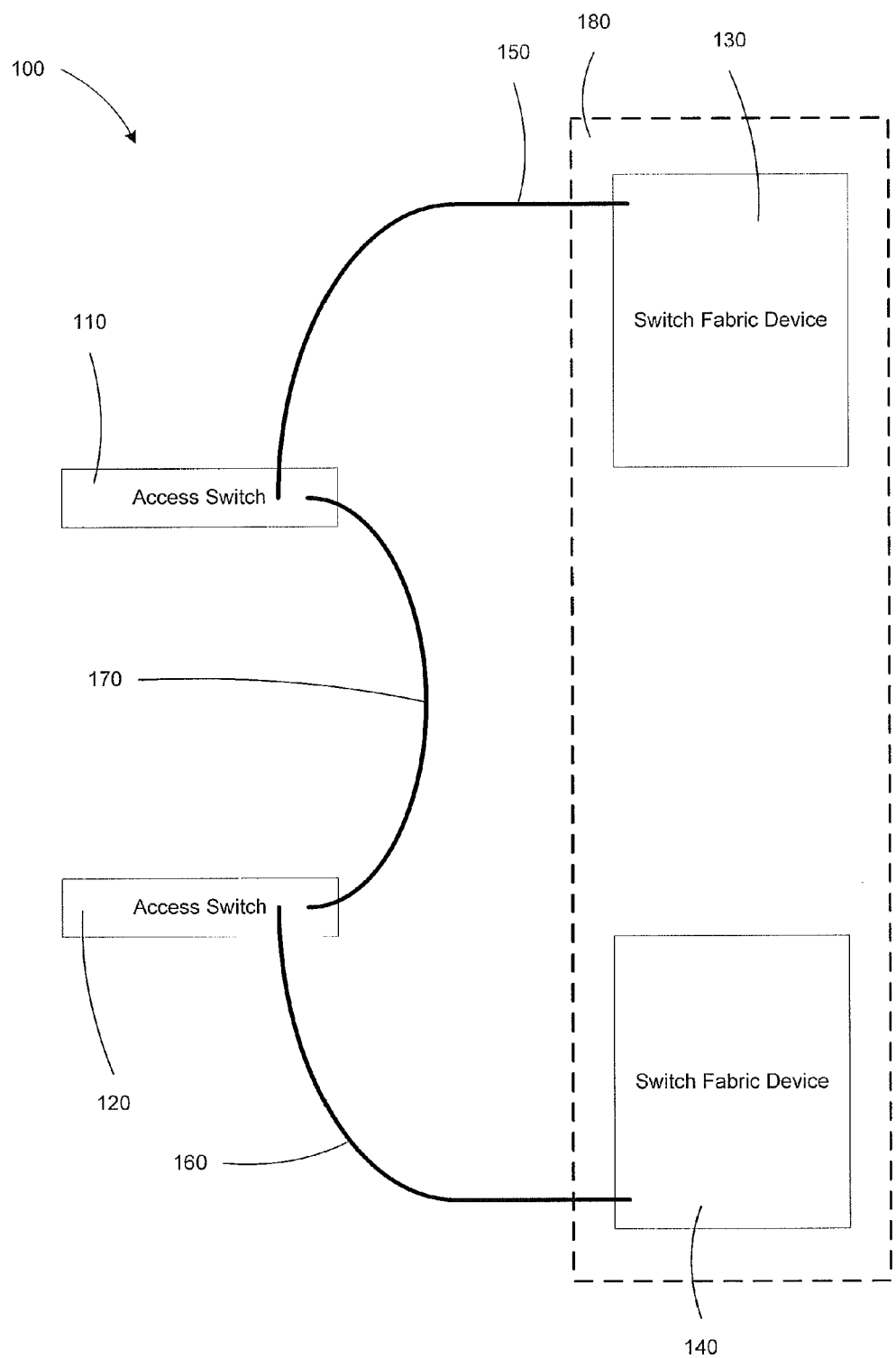
FIG. 1A is a schematic illustration of a switch fabric system, according to an embodiment.

In some embodiments, a system includes a first switch fabric device, a second switch fabric device, a first access switch operatively coupled to the first switch fabric device by a first cable, and a second access switch operatively coupled to the second switch fabric device by a second cable. The second access switch is operatively coupled to the first access switch by a third cable. The first access switch is configured to send data to the first switch fabric device via the first cable. The first access switch is configured to send data to the second switch fabric device via the third cable, the second access switch, and the second cable.

In some embodiments, the first access switch and the first switch fabric device are connected by a dedicated data path. Said another way, the first access switch can send and receive data from the first switch fabric device without multiplexing the data packets with other signals, without waiting for signals from other access switches to complete their transmission, and/or the like. In some embodiments, a portion of the dedicated data path is included within the first cable.

In some embodiments, the first access switch and the second switch fabric device are connected by a dedicated data path. In such embodiments, a portion of the dedicated data is included within the third cable, the second access switch, and/or the second cable. Similarly, in some embodiments, the second access switch can be connected to the first switch fabric device and/or the second switch fabric device by a dedicated data path.

In other embodiments, the first access switch can be connected to the first switch fabric device by a multiplex system included within the first access switch. The multiplex system can be configured to determine which signals are to be sent to the first access switch, the second access switch, the first switch fabric device and/or the second switch fabric device on a given data path. In some embodiments, the second access switch also includes a multiplex system. In such embodiments, the first access switch can send data to the first switch fabric device using the multiplex system included within the first access switch and the first cable. Similarly, the first access switch can send data to the second switch fabric device using the multiplex system included within the first access switch, the third cable, the multiplex system included within the second access switch, and the second cable.

In some embodiments, a system has multiple access switches including a first access switch and a second access switch, a first switch fabric device, and a second switch fabric device. Each access switch is disposed within a separate chassis and is physically coupled to at least one other access switch such that each access switch is operatively coupled to the remaining access switches. The first switch fabric device is physically and operatively coupled to the first access switch. The second switch fabric device is physically and operatively coupled to the second access switch. In some embodiments, each switch fabric device is disposed within a different chassis than the remaining switch fabric devices.

FIG. 1 is a schematic illustration of a system 100, according to an embodiment. System 100 includes a first access switch 110 a second access switch 120, a first cable 150, a second cable 160, a third cable 170, and a switch fabric 180.

The switch fabric 180 includes a first switch fabric device 130 and a second switch fabric device 140. The switch fabric devices 130, 140 are configured to allow an access switch within a first chassis (e.g., first access switch 110) to send data to an access switch within a second chassis. The access switch within the second chassis can be, for example, the second access switch 120 or a third access switch (not shown) coupled to the switch fabric 180 by a fourth cable (not shown). In some embodiments, for example, each switch fabric device 130, 140 can include a number of switch modules configured to route data between two separate access switches.

In some embodiments, each switch module within a switch fabric device 130, 140 is a cell switch. The cell switches are configured to redirect data as it progresses through the switch fabric. In some embodiments, for example, each cell switch includes multiple input ports operatively coupled to write interfaces on a memory buffer. Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell per time period and all output ports to read one outgoing cell per time period. Each cell switch operates similar to a crossbar switch that can be reconfigured subsequently for each time period.

In alternate embodiments, each switch module is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

In some embodiments, the switch fabric 180 can be similar to the switch fabrics shown and described in U.S. Patent Application Publication Number 2010/0165983, filed Dec. 29, 2008, entitled "System Architecture for Highly Scalable and Distributed Multi-Stage Switch Fabric," and U.S. Patent Application Publication Number 2010/0165984, filed Dec. 29, 2008, entitled "Methods and Apparatus related to a Modular Switch Architecture," both of which are incorporated herein by reference in their entireties. In some embodiments, for example, the switch fabric 180 can be a rearrangeably non-blocking Clos network such as a Benes network. In other embodiments, the switch fabric can be a strictly non-blocking Clos network. In still other embodiments, the switch fabric can be any switch fabric configured to route data from a first access switch to a second access switch. In yet other embodiments, the switch fabric can be an Ethernet switch or an internet protocol router that switches and/or routes data packets from a first access switch to a second access switch.

Figure 1B:
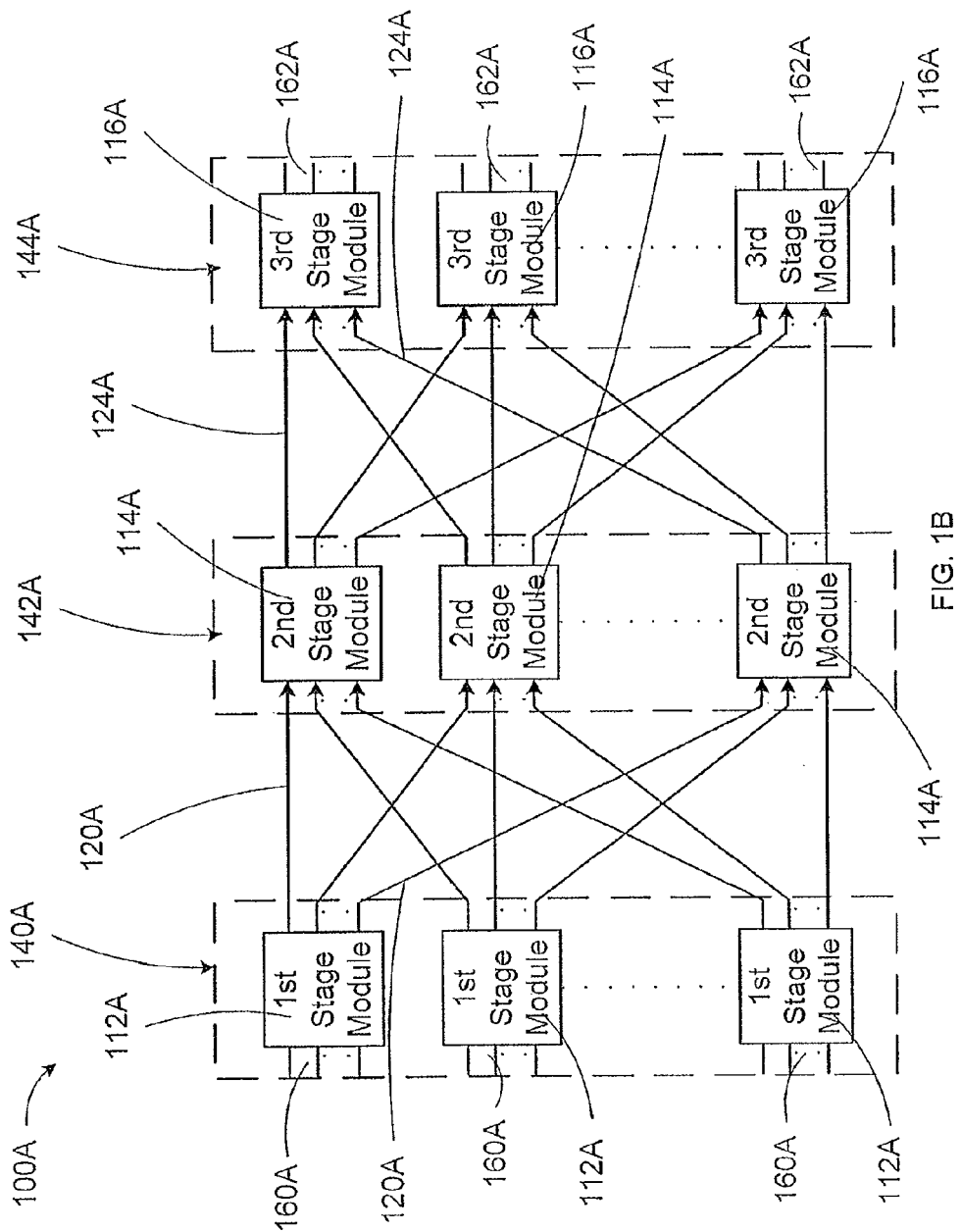
FIG. 1B is a schematic illustration of a switch fabric, according to an embodiment.

FIG. 1B is a schematic illustration of a switch fabric 100A, according to an embodiment. Switch fabric 100A is a three-stage, non-blocking Clos network and includes a first stage 140A, a second stage 142A, and a third stage 144A. The first stage 140A includes modules 112A. Each module 112A of the first stage 140A is an assembly of electronic components and circuitry. In some embodiments, for example, each module is an application-specific integrated circuit (ASIC). In other embodiments, multiple modules are contained on a single ASIC. In still other embodiments, each module is an assembly of discrete electrical components.

In some embodiments, each module 112A of the first stage 140A is a cell switch. The cell switches are configured to effectively redirect data as it flows through the switch fabric. In some embodiments, for example, each cell switch includes multiple input ports operatively coupled to write interfaces on a memory buffer. Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) per time period and all output ports to read one outgoing cell per time period. Each cell switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 112A of the first stage 140A includes a set of input ports 160A configured to receive data as it enters the switch fabric 100A. In this embodiment, each module 112A of the first stage 140A includes the same number of input ports 160A.

Similar to the first stage 140A, the second stage 142A of the switch fabric 100A includes modules 114A. The modules 114A of the second stage 142A are structurally similar to the modules 112A of the first stage 140A. Each module 114A of the second stage 142A is operatively coupled to each module of the first stage 140A by a data path 120A. Each data path 120A between each module of the first stage 140A and each module 114A of the second stage 142A is configured to facilitate data transfer from the modules 112A of the first stage 140A to the modules 114A of the second stage 142A.

The data paths 120A between the modules 112A of the first stage 140A and the modules 114A of the second stage 142A can be constructed in any manner configured to effectively facilitate data transfer from the modules 112A of the first stage 140A to the modules 114A of the second stage 142A. In some embodiments, for example, the data paths are optical connectors between the modules. In other embodiments, the data paths are within a midplane. Such a midplane can be similar to that described in further detail herein. Such a midplane can be effectively used to connect each module of the second stage with each module of the first stage. In still other embodiments, the modules are contained within a single chip package and the data paths are electrical traces.

In some embodiments, the switch fabric 100A is a non-blocking Clos network. Thus, the number of modules 114A of the second stage 142A of the switch fabric 100A varies based on the number of input ports 160A of each module 112A of the first stage 140A. In a rearrangeably non-blocking Clos network (e.g., a Benes network), the number of modules 114A of the second stage 142A is greater than or equal to the number of input ports 160A of each module 112A of the first stage 140A. Thus, if n is the number of input ports 160A of each module 112A of the first stage 140A and m is the number of modules 114A of the second stage 142A, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 144A of the switch fabric 100A includes modules 116A. The modules 116A of the third stage 144A are structurally similar to the modules 112A of the first stage 140A. The number of modules 116A of the third stage 144A is equivalent to the number of modules 112A of the first stage 140A. Each module 116A of the third stage 144A includes output ports 162A configured to allow data to exit the switch fabric 100A. Each module 116A of the third stage 144A includes the same number of output ports 162A. Further, the number of output ports 162A of each module 116A of the third stage 144A is equivalent to the number of input ports 160A of each module 112A of the first stage 140A.

Each module 116A of the third stage 144A is connected to each module 114A of the second stage 142A by a data path 124A. The data paths 124A between the modules 114A of the second stage 142A and the modules 116A of the third stage 144A are configured to facilitate data transfer from the modules 114A of the second stage 142A to the modules 116A of the third stage 144A.

The data paths 124A between the modules 114A of the second stage 142A and the modules 116A of the third stage 144A can be constructed in any manner configured to effectively facilitate data transfer from the modules 114A of the second stage 142A to the modules 116A of the third stage 144A. In some embodiments, for example, the data paths are optical connectors between the modules. In other embodiments, the data paths are within a midplane. Such a midplane can be similar to that described in further detail herein. Such a midplane can be effectively used to connect each module of the second stage with each module of the third stage. In still other embodiments, the modules are contained within a single chip package and the data paths are electrical traces.

The switch fabric devices 130, 140 can have any number of stages and/or switches to route data from a access switch within a first chassis (e.g., the first access switch 110) to a access switch within a second chassis (e.g., the second access switch 120 or a third access switch as described above). In some embodiments, for example, each switch fabric device 130, 140 has three stages each of which include multiple switch modules. In other embodiments, each switch fabric device has five stages each of which includes multiple switch modules.

In some configurations, each switch fabric device 130, 140 of the switch fabric 180 operates as a stand-alone switch fabric. This allows the first switch fabric device 130 to operate as a primary switch fabric and the second switch fabric device 140 to be used for redundancy. Thus, if the first switch fabric device 130 fails to operate, data will not be lost because the second switch fabric device 140 will continue to operate. In other configurations, the second switch fabric device 140 is used to increase the number of possible data paths between two access switches. This decreases the traffic and/or congestion within the switch fabric devices 130, 140. In such a configuration, the switch fabric devices 130, 140 operate together to form a larger switch fabric.

The first access switch 110 is configured to send data to and receive data from the switch fabric 180 (including the first switch fabric device 130 and the second switch fabric device 140). The first access switch 110 can include a processor, a memory buffer, switch modules and/or any other element to assist to send data to and receive data from the switch fabric 180. The second access switch 120 is substantially similar to the first access switch 110 and is therefore not described in detail herein.

In some embodiments, the first access switch 110 is configured to perform operations on a data packet before it is sent to the switch fabric 180. Such operations can include, for example, data packet parsing, data packet classification, and/or data packet forwarding. In some embodiments, data buffering and switch fabric flow control also occur at the first access switch 110. In such embodiments, the first access switch 110 prepares the data packet to enter the switch fabric 180 and sends the data to the switch fabric 180.

Figure 3:
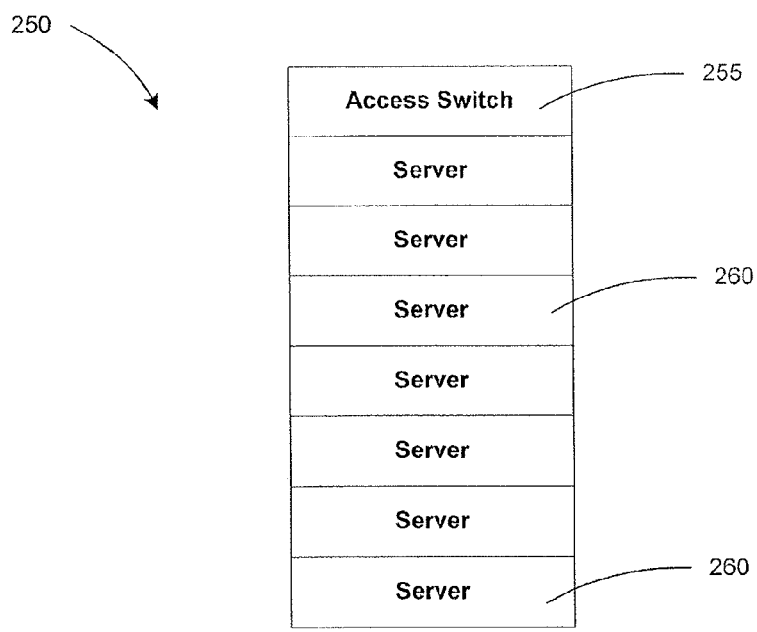
FIG. 3 is a schematic illustration of a chassis within a switch fabric system, according to another embodiment.

The first access switch 110 of the system 100 is disposed within a first chassis. The first chassis can be similar to the chassis 250 illustrated in FIG. 3. As shown in FIG. 3, chassis 250 includes an access switch 255 and multiple servers 260. Each server 260 is operatively coupled to the access switch 255 via a backplane connection (not shown). Each server 260 is configured to send data to and receive data from the access switch 255. In other embodiments, each server can be operatively coupled to the access switch in any manner. For example, in some embodiments, a midplane, multiple cables, a wireless connection and/or the like is used to couple the servers 260 to the access switch 255. Returning to FIG. 1, the second access switch 120 of the system 100 is disposed within a second chassis. The second chassis can be similar to the chassis 250.

Figure 2:
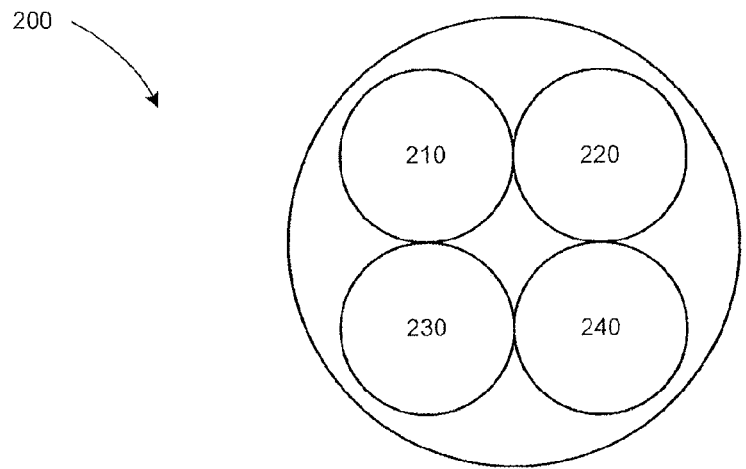
FIG. 2 is a schematic illustration of a cross-section of a cable within a switch fabric system, according to another embodiment.

The first access switch 110 is coupled to the first switch fabric device 130 of the switch fabric 180 by the first cable 150. The first cable 150 can have a cross-section similar to the cable 200 shown in FIG. 2. As shown in FIG. 2, the cable 200 includes a first strand 210, a second strand 220, a third strand 230 and a fourth strand 240. The strands 210, 220, 230, 240 can be constructed of any material configured to carry a data signal. In some embodiments, for example, the strands 210, 220, 230, 240 are optical fibers configured to carry an optical signal. In other embodiments, the strands are electrical conductors, such as copper, configured to carry an electrical signal. In other embodiments, the first cable can include any number of strands such that the first cable is capable of effectively carrying a data signal from an access switch 110 to the first switch fabric device 130.

The first strand 210 of the first cable 150 and the second strand 220 of the first cable 150 are configured to operatively couple the first access switch 110 to the first switch fabric device 130 of the switch fabric 180. For example, the first strand 210 of the first cable 150 and the second strand 220 of the first cable 150 can be configured to carry data sent by the first access switch 110 to the first switch fabric device 130 and/or to carry data sent by the first switch fabric device 130 to the first access switch 110. In some embodiments, for example, the first strand 210 of the first cable 150 is configured to carry data sent from the first access switch 110 to the first switch fabric device 130. In such an embodiment, the second strand 220 of the first cable 150 can be configured to carry data in the opposite direction (i.e., data sent from the first switch fabric device 130 to the first access switch 110). This provides a dedicated data path between the first access switch 110 and the first switch fabric device 130. Said another way, the first access switch 110 can send and receive data from the first switch fabric device 130 without multiplexing the data packets with other signals, without waiting for signals from other access switches to complete their transmission, and/or the like.

In some embodiments, the third strand 230 of the first cable 150 and the fourth strand 240 of the first cable 150 can be part of a dedicated data path between the first switch fabric device 130 and the second access switch 120, as described in further detail herein. In other embodiments, a multiplexing system can be used to allow the strands of the first cable to carry a signal to and/or from the first switch fabric and the access switches, as described in detail herein.

The second access switch 120 is coupled to the second switch fabric device 140 of the switch fabric 180 by the second cable 160. The second cable 160 can be similar to the first cable 150 and the cable 200 shown in FIG. 2. In some embodiments, for example, the third strand 230 of the second cable 160 and the fourth strand 240 of the second cable 160 are configured to carry data sent by the second access switch 120 to the second switch fabric device 140 and/or to carry data sent by the second switch fabric device 140 to the second access switch 120. The third strand 230 of the second cable 160 and the fourth strand 240 of the second cable 160 are configured to operatively couple the second access switch 120 to the second switch fabric device 140 of the switch fabric 180. For example, the third strand 230 of the second cable 160 and the fourth strand 240 of the second cable 160 can be configured to carry data sent by the second access switch 120 to the second switch fabric device 140 and/or to carry data sent by the second switch fabric device 140 to the second access switch 120. In some embodiments, for example, the third strand 230 of the second cable 160 is configured to carry data sent from the second access switch 120 to the second switch fabric device 140. In such an embodiment, the fourth strand 240 of the second cable 160 can be configured to carry data in the opposite direction (i.e., data sent from the second switch fabric device 140 to the second access switch 120). This provides a dedicated data path between the second access switch 120 and the second switch fabric device 140. Said another way, the second access switch 120 can send and receive data from the second switch fabric device 140 without multiplexing the data packets with other signals, without waiting for signals from other access switches to complete their transmission, and/or the like.

In some embodiments, the first strand 210 of the second cable 160 and the second strand 220 of the second cable 160 can be part of a dedicated data path between the second switch fabric device 140 and the first access switch 110, as described in further detail herein. In other embodiments, a multiplexing system can be used to allow the strands of the second cable to carry a signal to and/or from the second switch fabric device and the access switches, as described in detail herein.

The second access switch 120 is coupled to the first access switch 110 by the third cable 170. The third cable 170 can be similar to the first cable 150, the second cable 160, and the cable 200 shown in FIG. 2. The third cable 170 is configured to send data between the first access switch 110 and the second access switch 120. In some embodiments, for example, the first strand 210 of the third cable 170 and the fourth strand 240 of the third cable 170 are configured to carry data sent from the first access switch 110 to the second access switch 120. In such an embodiment, the second strand 220 of the third cable 170 and the third strand 230 of the third cable 170 can be configured to carry data sent in the opposite direction (i.e., data sent from the second access switch 120 to the first access switch 110).

The third cable 170 can be used to operatively couple the first access switch 110 to the second switch fabric device 140, and the second access switch 120 to the first switch fabric device 130. In some embodiments, for example, the first strand 210 of the third cable 170 can be operatively coupled to the first strand 210 of the second cable 160 in any manner that allows a signal carried by the first strand 210 of the third cable 170 to be passed on to the first strand 210 of the second cable 160. In some embodiments, for example, a multiplexing system disposed on the second access switch 120 operatively couples the first strand 210 of the second cable 160 to the first strand 210 of the third cable 170. In other embodiments, an electrical trace disposed on the second access switch 120 operatively couples the first strand of the second cable to the first strand of the third cable.

In some embodiments, operatively coupling the first strand 210 of the second cable 160 to the first strand 210 of the third cable 170 allows a dedicated path to be established between the first access switch 110 and the second switch fabric device 140. Such a dedicated data path allows a data packet to be sent from the first access switch 110 to the second switch fabric device 140 via the first strand 210 of the third cable 170, the second access switch 120 and the first strand 210 of the second cable 160, as described in further detail herein. In other embodiments, the dedicated data path allows a data packet to be sent in the opposite direction (i.e., data sent from the second switch fabric device to the first access switch via the first strand of the second cable, the second access switch and the first strand of the third cable). In still other embodiments, the data path is not dedicated and the data lines are be multiplexed at the second access switch for a data path to be established between the first access switch and the second switch fabric device.

In a similar manner, the second strand 220 of the second cable 160 can be operatively coupled to the second strand 220 of the third cable 170 such that a second dedicated data path is formed between the first access switch 110 and the second switch fabric device 140. Having two dedicated data paths between the first access switch 110 and the second switch fabric device 140 allows the first dedicated data path to be reserved for data transfer in a first direction (from the first access switch 110 to the second switch fabric device 140) and the second dedicated data path to be reserved for data transfer in a second direction (from the second switch fabric device 140 to the first access switch 110). Having a dedicated line for data transfer in the first direction and a dedicated line for data transfer in the second direction rather than a single line used for both data transfer in the first direction and data transfer in the second direction, increases the throughput capabilities of the system 100.

Similarly, the second access switch 120 is operatively coupled to the first switch fabric device 130. In some embodiments, for example, the third strand 230 of the third cable 170 can be operatively coupled to the third strand 230 of the first cable 150 in any manner that allows a signal carried by the third strand 230 of the third cable 170 to be passed on to the third strand 230 of the first cable 150. In some embodiments, for example, a multiplexing system disposed on the first access switch 110 operatively couples the third strand 230 of the first cable 150 to the third strand 230 of the third cable 170. In other embodiments, an electrical trace disposed on the first access switch operatively couples the third strand of the first cable to the third strand of the third cable.

In some embodiments, operatively coupling the third strand 230 of the first cable 150 to the third strand 230 of the third cable 170 allows a dedicated path to be established between the second access switch 120 and the first switch fabric device 130. Such a dedicated data path allows a data packet to be sent from the second access switch 120 to the first switch fabric device 130 via the third strand 230 of the third cable 170, the first access switch 110 and the third strand 230 of the first cable 150, as described in further detail herein. In other embodiments, the dedicated data path allows a data packet to be sent in the opposite direction (i.e., data sent from the first switch fabric device to the second access switch via the third strand of the first cable, the first access switch and the third strand of the third cable). In still other embodiments, the data path is not dedicated and the data lines are be multiplexed at the first access switch in order for a data path to be established between the second access switch and the first switch fabric device.

In a similar manner, the fourth strand 240 of the first cable 150 is operatively coupled to the fourth strand 240 of the third cable 170 such that a second dedicated data path is formed between the second access switch 120 and the first switch fabric device 130. Having two dedicated data paths between the second access switch 120 and the first switch fabric device 130 allows the first dedicated data path to be reserved for data transfer in a first direction (from the second access switch 120 to the first switch fabric device 130) and the second dedicated data path to be reserved for data transfer in a second direction (from the first switch fabric device 130 to the second access switch 120). Having a dedicated line for data transfer in the first direction and a dedicated line for data transfer in the second direction, rather than a single line used for both data transfer in the first direction and data transfer in the second direction, increases the throughput capabilities of the system 100.

In use, the first access switch 110 and/or the second access switch 120 can send data packets to and/or receive data packets from the first switch fabric device 130 and/or the second switch fabric device 140. In some embodiments, for example, the first access switch 110 sends a data packet to the first switch fabric device 130 by sending the data packet through the first strand 210 of the first cable 150. Similarly, the first switch fabric device 130 can send a data packet to the first access switch 110 through the second strand 220 of the first cable 150.

In some embodiments, the first access switch 110 can send a data packet to the second switch fabric device 140 by first sending the data packet to the second access switch 120 via the first strand 210 of the third cable 170. In embodiments where a dedicated data path exists between the first access switch 110 and the second switch fabric device 140, the data packet passes through the second access switch 120 without being multiplexed, and is sent via the first strand 210 of the second cable 160 to the second switch fabric device 140. In other embodiments, where a dedicated data path does not exist between the first access switch and the second switch fabric device, the second access switch can buffer, multiplex and/or manipulate the data packet in other ways before forwarding the data packet to the second switch fabric device via the second cable. In some embodiments, various control signals can be set in a multiplexing system to allow the data packet to pass through the second access switch. Similarly, the second switch fabric device 140 sends a data packet to the first access switch 110 through the second strand 220 of the second cable 160, the second access switch 120 and the second strand 220 of the third cable 170.

In some embodiments, the second access switch 120 sends a data packet to the second switch fabric device 140 by sending the data packet through the third strand 230 of the second cable 160. Similarly, the second switch fabric device 140 sends a data packet to the second access switch 120 through the fourth strand 240 of the second cable 160.

In some embodiments, the second access switch 120 can send a data packet to the first switch fabric device 130 by first sending the data packet to the first access switch 110 via the third strand 230 of the third cable 170. In embodiments where a dedicated data path exists between the second access switch 120 and the first switch fabric device 130, the data packet passes through the first access switch 110 without being multiplexed, and is sent via the third strand 230 of the first cable 150 to the first switch fabric device 130. In other embodiments, where a dedicated data path does not exist between the second access switch and the first switch fabric device, the first access switch can buffer, multiplex and/or manipulate the data packet in other ways before forwarding the data packet to the first switch fabric device via the first cable. In some embodiments, various control signals can be set in a multiplexing system to allow the data packet to pass through the first access switch. Similarly, the first switch fabric device 130 sends a data packet to the second access switch 120 through the fourth strand 240 of the first cable 150, the first access switch 110 and the fourth strand 240 of the third cable 170. Thus, using the cables 150, 160, 170 and the access switches 110, 120, the first access switch 110 and the second access switch 120 can send data to and receive data from the first switch fabric device 130 and the second switch fabric device 140.

Figure 4:
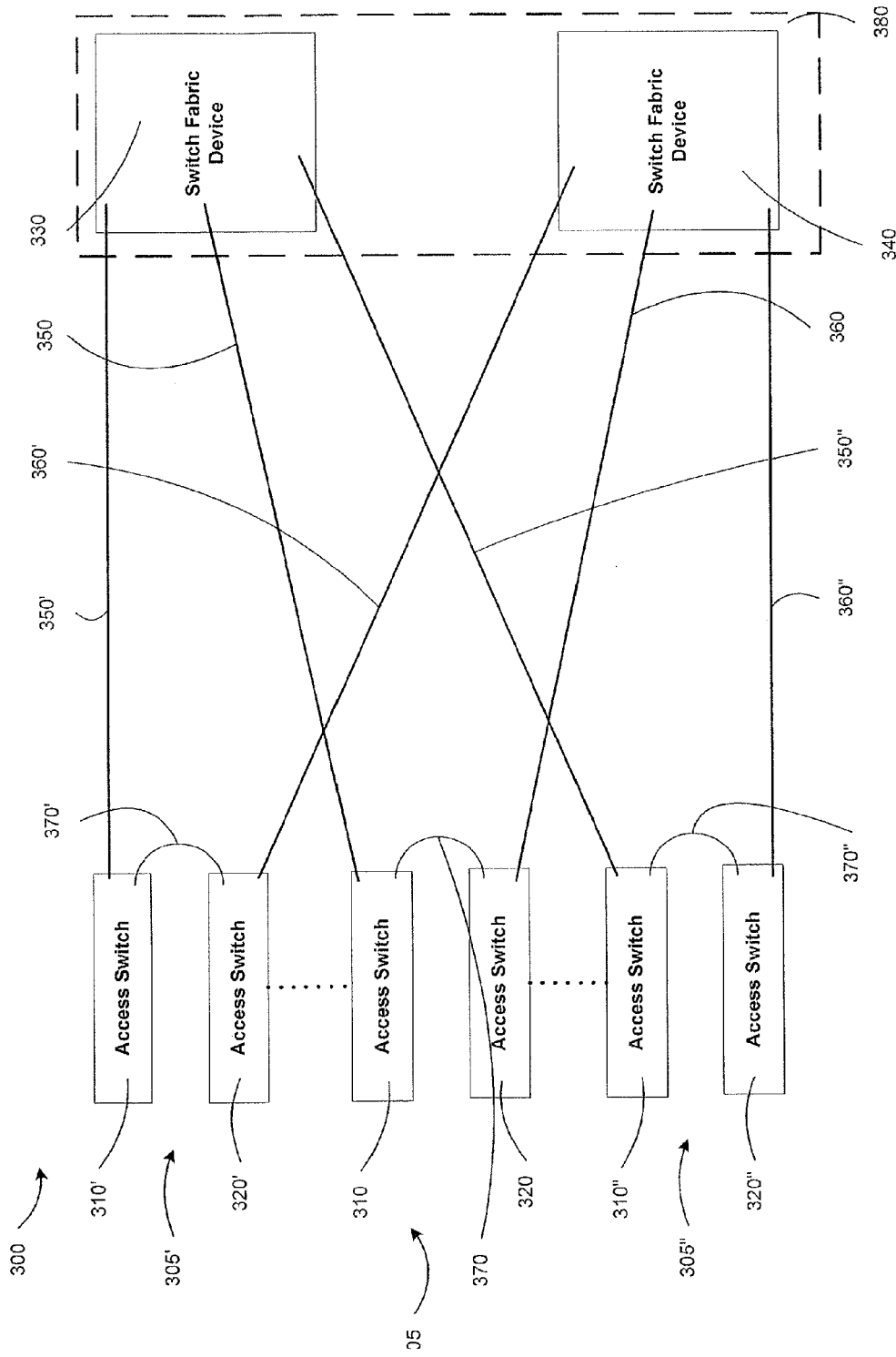
FIG. 4 is a schematic illustration of a switch fabric system, according to another embodiment.

While shown in FIG. 1 as each only having a single connection, the switch fabric devices 130, 140 can be operatively and physically coupled to multiple access switches and/or access switch pairs. FIG. 4, for example, shows a system 300 having a switch fabric 380 coupled to multiple access switch pairs 305 by multiple first cables 350 and multiple second cables 360. The system 300 further includes multiple third cables 370 that couple a first access switch 310 of an access switch pair 305 to a second access switch 320 of the access switch pair 305. The cables 350, 360, 370 are structurally and functionally similar to the cables 150, 160, 170 described above.

The switch fabric 380 is structurally and functionally similar to the switch fabric 180 shown and described in relation to FIG. 1. As such, the switch fabric 380 includes a first switch fabric device 330 and a second switch fabric device 340 configured to allow an access switch 310, 320 within a first chassis to send data to an access switch 310, 320 within a second chassis. For example, the first switch fabric device 330 and/or the second switch fabric device 340 can receive data from a first access switch 310, 320 and route the data to a second access switch 310 or 320.

Each access switch pair 305 includes a first access switch 310 and a second access switch 320. The first access switch 310 and the second access switch 320 of each access switch pair 305 are structurally and functionally similar to the first access switch 110 and the second access switch 120 shown and described above. Each access switch 310, 320 is operatively coupled to the first switch fabric device 330 and the second switch fabric device 340 via the first cables 350, the second cables 360, and/or the third cables 370.

In use, any of the access switches 310', 320' within a first access switch pair 305' can send data through the switch fabric 380 to the access switches 310, 320 within the remaining access switch pairs 305. Because the switch fabric 380 includes a first switch fabric device 330 and a second switch fabric device 340, two data paths exist between two separate access switches. For example, the access switch 310' can send data to the access switch 320" through the first switch fabric device 330 and/or the second switch fabric device 340. The access switch 310' can send the data to the access switch 320" by first sending the data to the first switch fabric device 330 via the cable 350'. The first switch fabric device 330 then routes the data such that it sends the data to the first access switch 310" within the second access switch pair 305" via the cable 350". The data passes through the access switch 310"', the cable 370" and to access switch 320". Alternatively, the access switch 310' can send the data to the access switch 320" via the cable 370', the access switch 320', the cable 360', the second switch fabric device 340, and the cable 360". In such a manner, any access switch can send data to any of the other access switches via multiple possible routes.

Figure 5:
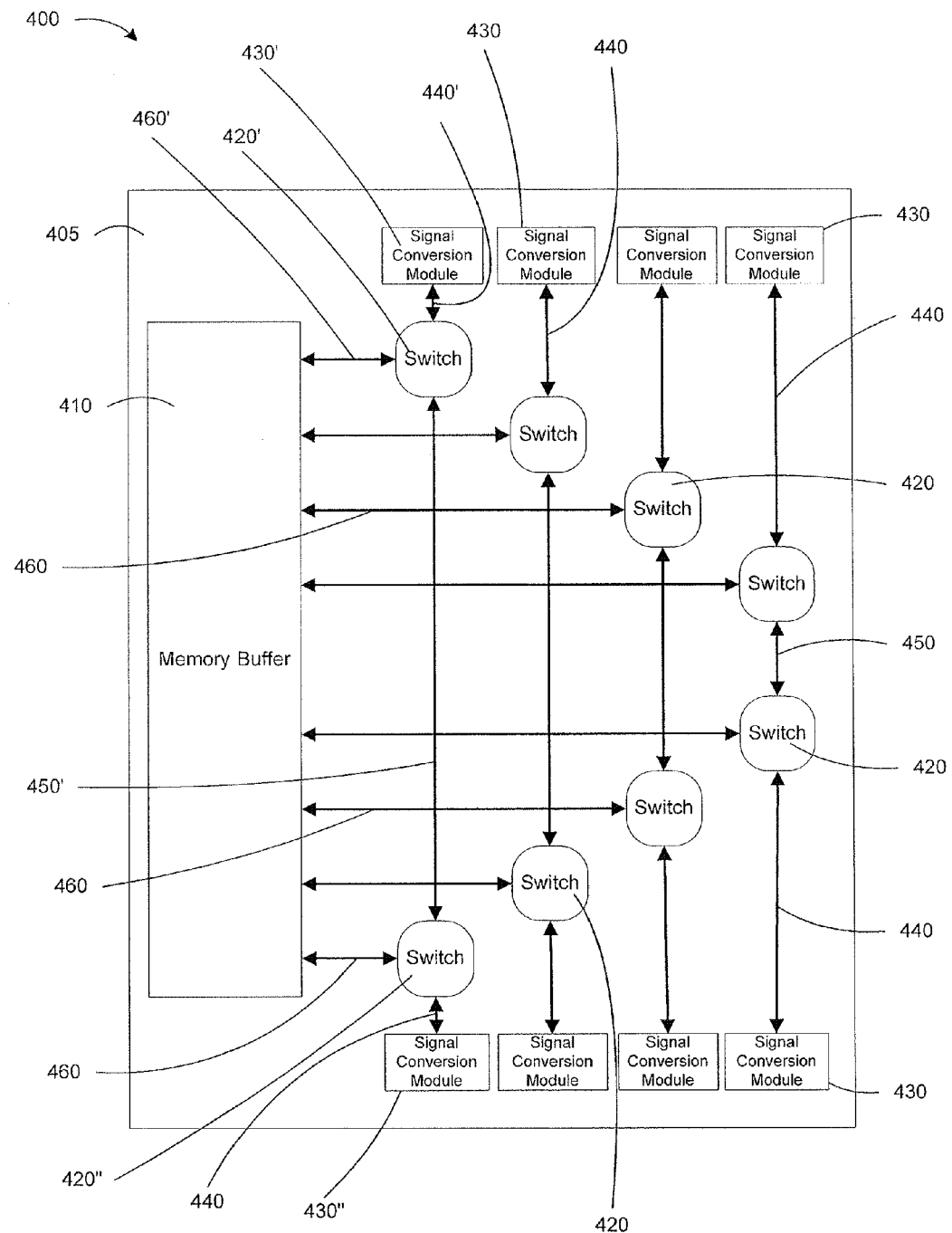
FIG. 5 is a schematic illustration of a portion of an access switch, according to another embodiment.

FIG. 5 is a schematic illustration of a portion 400 of an access switch, according to another embodiment. The portion 400 of the access switch includes a memory buffer 410, multiple switches 420, multiple signal conversion modules 430, and multiple connection lines 440, 450, 460. In some embodiments, the portion 400 of the access switch is included within a single chip package. In such embodiments, the portion 400 of the access switch can be within a single application-specific integrated circuit (ASIC). In other embodiments, the elements shown and described with respect to the portion of the access switch are included within separate chip packages, ASICs and/or the like. In yet other embodiments, the elements shown and described with respect to the portion of the access switch are part of separate access switches.

The portion 400 of the access switch shown is operatively coupled to two cables of a system. In some embodiments, for example, a first cable (e.g., first cable 150 shown in FIG. 1) operatively couples the portion 400 of the access switch (e.g., first access switch 110 shown in FIG. 1) with a switch fabric device (e.g., first switch fabric device 130 shown in FIG. 1). A second cable (e.g., third cable 170 shown in FIG. 1) operatively couples the portion 400 of the access switch with a second access switch (e.g., second access switch 120 shown in FIG. 1). In some embodiments, for example, each signal conversion module 430 is operatively coupled to a strand of a cable, as further described herein. For example, four signal conversion modules 430 are operatively coupled to the four strands of the first cable and the other four signal conversion modules 430 are operatively coupled to the four strands of the second cable. This allows data to be sent between the portion 400 of the access switch and a switch fabric device and/or another access switch.

The signal conversion modules 430 are configured to convert the data signals received by the access switch (e.g., from a switch fabric and/or another access switch) to a format compatible with the access switch. Additionally, the signal conversion modules 430 are configured to convert the data signals to be sent from the access switch to a format compatible with the cables carrying the data signals. In some embodiments, for example, each signal conversion module 430 is configured to convert a signal of a first format to a signal of a second format, and vice versa. In some embodiments, for example, the signal conversion modules 430 convert an electrical signal (used within the access switch) to an optical signal (used in the cables), and vice versa. In other embodiments, the signal conversion modules convert a parallel signal to a serial signal, and vice versa.

In some embodiments, for example, each signal conversion module 430 is a serializer/deserializer (SERDES). A SERDES can be used to convert data between a serial signal and a parallel signal. For example, in some embodiments, data is serially transmitted by a cable to the signal conversion module 430. The signal conversion module 430 then converts the data into a parallel data signal that can be used by the access switch. The access switch can increase its bandwidth by using such a parallel data signal.

In some embodiments, each signal conversion module 430 is a 10 gigabit serial link running at 10.3125 Gbit/s using a 64 b/66 b encoding scheme. In other embodiments, other industry standard physical layers such as serial gigabit media independent interfaces (SGMII), 1000Base-T, 10GBase-CX4, 10GBase-T and/or other types of electrical and/or optical physical layers that are running at slower or faster data rates can be used to receive a signal from optical fibers and/or other cabling, and convert the signal to a format that can be used by the access switch.

The memory buffer 410 is configured to store data packets received by the access switch and/or store data packets to be sent from the access switch to a switch fabric. In some embodiments, for example, the access switch can include a processor (not shown) configured to write data packets to be sent to the switch fabric to the memory buffer. Similarly, the processor can be configured to retrieve data packets stored in the memory buffer that were received from a switch fabric. Such data packets can be retrieved for further processing.

The memory buffer 410 can include one or more types of memory. For example, the memory buffer 410 can include a read only memory (ROM) component and a random access memory (RAM) component. The memory buffer 410 can also include other types of memory suitable for buffering data, for example, flash memory. In other embodiments, the memory buffer can be a shared memory buffer implemented using on-chip static random access memory (SRAM).

The memory buffer 410 is operatively coupled to multiple switches 420 by the connection lines 460. In some embodiments, each connection line 460 is a bidirectional connection line configured to carry data packets between the memory buffer 410 and a switch 420. In other embodiments, each bidirectional connection line is constructed of multiple unidirectional connection lines (see e.g., FIG. 6). In such an embodiment, a single unidirectional connection line can be used to send data from the memory buffer to a switch and a single unidirectional connection line can be used to send data from the switch to the memory buffer. In yet other embodiments, the bidirectional connection line includes a series of multiple bidirectional connection lines and/or unidirectional connection lines between the memory buffer and the switch. This allows data to be sent from the memory buffer to the switch (and from the switch to the memory buffer) in parallel. In still other embodiments, each connection line 460 can be a single unidirectional connection line. In such embodiments, the memory buffer sends data to some of the switches and receives data from other switches.

The connection lines 460 can be constructed of materials and/or components capable of carrying a data packet from the memory buffer 410 to a switch, and vice versa. In some embodiments, for example, the connection lines 460 can be electrical traces within a chip package. In other embodiments, the connection lines can be optical fibers, electrical cables, and/or the like.

Each switch 420 is also operatively coupled to another switch 420 by connection lines 450. Additionally, each switch 420 is operatively coupled to a signal conversion module 430, described in further detail herein, by connection lines 440.

Connection lines 450 and connection lines 440 are structurally and functionally similar to the connection lines 460 described above.

The switches 420 can be any device configured to operatively couple (e.g., electrically couple) a first connection line with a second connection line. In some embodiments, for example, the switches 420 can include a multiplexer configured to connect the first connection line to the second connection line or a third connection line upon receiving various control signals. In other embodiments, switches are not used and the first connection line is coupled to the second connection line via an electrical trace. In such embodiments, the lines between the different elements are dedicated and are not reconfigurable, as described in further detail herein.

In some embodiments, for example, the switch 420' has a first configuration, a second configuration, and a third configuration. In the first configuration, the switch 420' operatively couples the connection line 440' to the connection line 460', defining a data path between the signal conversion module 430' and the memory buffer 410. Additionally, the connection line 450' is not operatively coupled to either the connection line 440' or the connection line 460', when the switch 420' is in the first configuration. In the second configuration, the switch 420' operatively couples the connection line 450' to the connection line 460' while the connection line 440' is not operatively coupled to the connection line 450' or the connection line 460'. This defines a data path between a second switch 420" and the memory buffer 410. In the third configuration, the switch 420' operatively couples the connection line 440' to the connection line 450' while the connection line 460' is not operatively coupled to the connection line 440' or the connection line 450'. This defines a data path between a second switch 420" and the signal conversion module 430'.

In some embodiments, the switch 420' is moved between the first configuration, the second configuration and the third configuration based on a control signal (not shown) received by the switch 420'. This allows the switch 420' to operatively couple the connection lines 440', 450', 460' and to send data to the memory buffer 410 and/or through the access switch, as described in further detail herein.

In use, data received by the portion 400 of the access switch can be routed through the access switch or stored at the memory buffer 410. Similarly, data sent from the memory buffer 410 can be routed such that it is sent from the access switch to different elements of a system (e.g., to a switch fabric or a second access switch).

In some embodiments, for example, if the signal conversion module 430' receives a data signal, it first converts the signal into a format compatible for the portion 400 of the access switch. The signal conversion module 430' then sends the data signal to the switch 420'. Depending on whether the switch 420' is in its first configuration, its second configuration or its third configuration, the data signal will be sent to different elements. For example, when the switch 420' is in its first configuration, the connection line 440' is operatively coupled to the connection line 460' and the data signal is sent to the memory buffer 410. If the switch 420' is in its second configuration, the connection line 440' is not operatively coupled to either the connection line 450' or the connection line 460'. Thus, the data signal is dropped and not further processed because connection line 440' is not operatively coupled to another connection line. In some embodiments, the switch 420' can have a buffer configured to buffer data received from a connection line that is not currently operatively coupled to another connection line. In such an embodiment, the data signal can be stored within the buffer until the connection line 440' is coupled to either the connection line 450' or the connection line 460' (i.e., the data signal is not dropped). In some embodiments, if the switch 420' is in a configuration that would forward the data signal incorrectly (i.e., the switch 420' is in the first configuration but the data signal is to be sent to the switch 420"), the data signal is buffered until the switch can be moved such that the data signal can properly forwarded.

When the switch 420' is in its third configuration the connection line 440' is operatively coupled to the connection line 450'. Thus, the data signal can be sent to the switch 420". The switch 420" can then either send the switch to the memory buffer 410 or to a signal conversion module 430 to be sent to another element of the system through a cable.

The memory buffer 410 is also configured to send data packets to other elements within a system. For example, the memory buffer 410 can send a data signal to the switch 420' via the connection line 460'. If the switch 420' is in its first configuration or its second configuration, the data signal will be sent to the signal conversion module 430' or the switch 420", respectively. If the switch 420' is in its third configuration, the data signal will either be dropped or buffered until it can be sent to either the signal conversion module 430' or the switch 420". If the switch 420' sends the data signal to the signal conversion module 430', the data signal is converted into a format to be sent through a cable to another portion of the system. If the switch 420' sends the data signal to the switch 420", depending on the configuration that the switch 420" is in, the data is either sent back to the memory buffer 410 or sent to the signal conversion module 430". Similar to the signal conversion module 430', the signal conversion module 430" converts and sends the data signal to another portion of the system via a cable. In such a manner, the portion 400 of the access switch can store data signals (i.e., in the memory buffer 410) and/or forward data signals to another access switch and/or a switch fabric.

Figure 6:
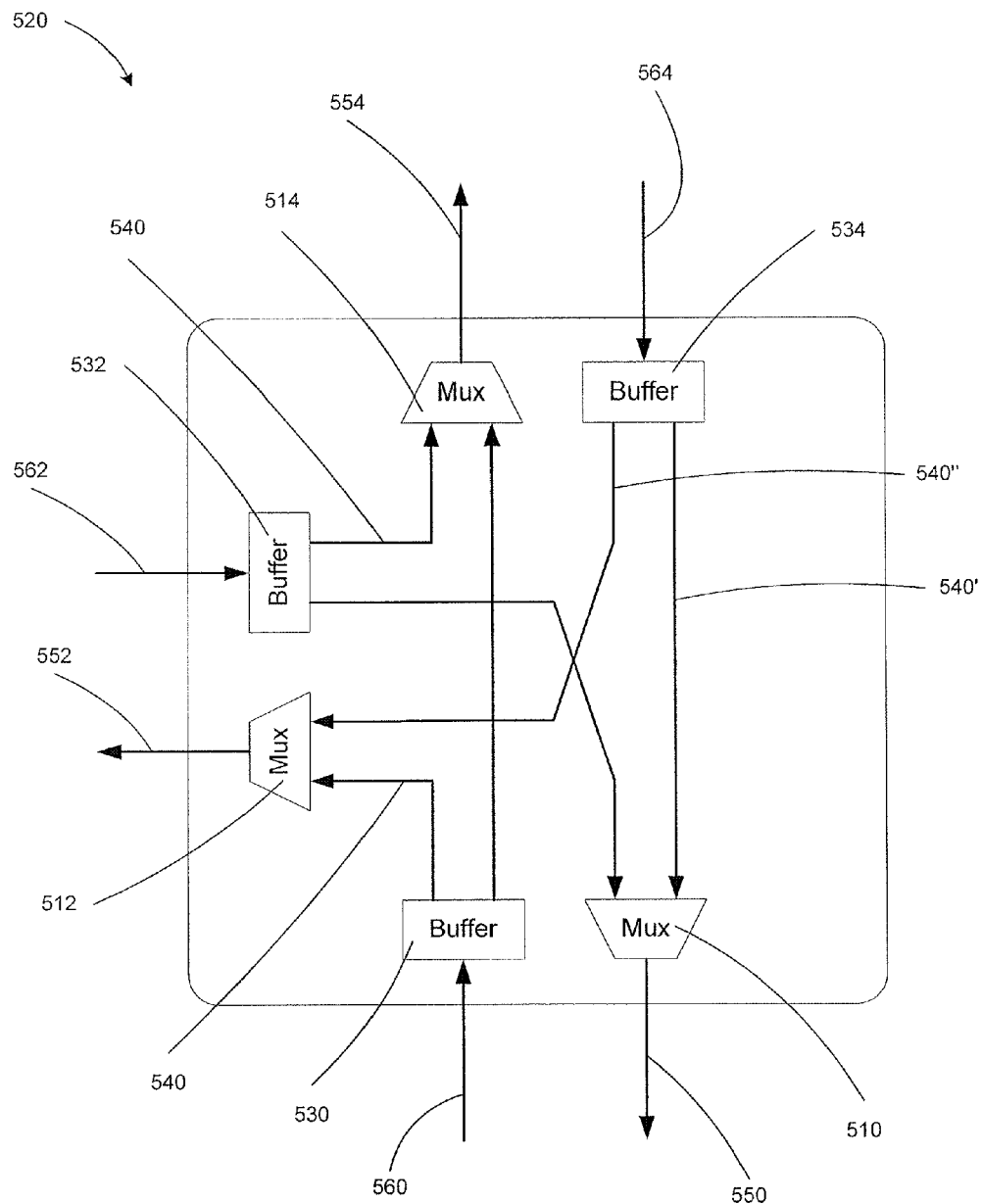
FIG. 6 is a schematic illustration of a portion of an access switch, according to another embodiment.

As described above, each bidirectional connection line can be constructed of two unidirectional connection lines that allow data to travel in opposite directions. For example, FIG. 6 shows a detailed illustration of a switch 520 used in such an embodiment. Similar to the switches 420, the switch 520 can be used in a portion of an access switch similar to the portion 400. The switch 520 includes multiple buffers 530, 532, 534, multiple multiplexers 510, 512, 514, multiple internal connection lines 540, multiple input connection lines 560, 562, 564, and multiple output connection lines 550, 552, 554.

The buffers 530, 532, 534 can be any memory configured to store a data signal. The buffers 530, 532, 534 can include one or more types of memory. For example, the buffers 530, 532, 534 can include a read only memory (ROM) component and a random access memory (RAM) component. The buffers 530, 532, 534 can also include other types of memory suitable for buffering data, for example, flash memory. In other embodiments, the memory buffer can be a shared memory buffer implemented using on-chip static random access memory (SRAM).

Each buffer 530, 532, 534 is operatively coupled to other elements in the access switch (e.g., other switches, a memory buffer similar to memory buffer 410, a signal conversion module similar to signal conversion modules 430) by an input connection line 560, 562, 564. Input connection lines 560, 562, 564 are configured to carry data signals from other elements of the access switch to a buffer 530, 532, 534 within the switch 520. The input connection lines 560, 562, 564 can be constructed of any materials and/or components capable of carrying a data signal from elements of the access switch outside the switch 520 to a buffer 530, 532, 534 within the switch 520. In some embodiments, for example, the input connection lines 560, 562, 564 can be electrical traces within a chip package, such as an ASIC. In other embodiments, the connection lines can be optical fibers, electrical cables, and/or the like.

Each buffer 530, 532, 534 is operatively coupled to two multiplexers 510, 512, 514 by the multiple internal connection lines 540. The internal connection lines 540 can be structurally similar to the input connection lines 560, 562, 564. The internal connection lines 540 are configured to carry data sent from a buffer 530, 532, 534 to a multiplexer 510, 512, 514.

The multiplexers 510, 512, 514 are configured to operatively couple one of two internal connection lines 540 with a single outgoing connection line 550, 552, 554. The outgoing connection lines 550, 552, 554 are structurally similar to the input connection lines 560, 562, 564 and are configured to carry data sent from a multiplexer within the switch 520 to other elements within the access switch such as, for example, other switches, a memory buffer similar to memory buffer 410, and/or a signal conversion module similar to signal conversion modules 430.

The multiplexers 510, 512, 514 can be any device configured to operatively switch between one of two input connections. In some embodiments, for example, each multiplexer is a multiple-input, single-output switch. Thus, the multiplexer operatively couples one of the inputs to the output at any given time. Additionally, the multiplexers 510, 512, 514 can be controlled by any control signal. The control signal can be configured to change the multiplexer 510, 512, 514 from operatively coupling a first input connection to the output connection, to operatively coupling a second input connection to the output connection, and vice versa. Thus, the control signal determines which input is outputted.

In use, a data signal can be received by the switch 520 on any of the input connection lines 560, 562, 564. For example, a data signal received by the input connection line 564 is stored in the buffer 534. The buffer 534 can then send the data signal to multiplexer 510 and multiplexer 512. If the data signal is to be forwarded to an element in the access switch operatively coupled to the output connection line 550, the multiplexer 510 operatively couples the internal connection line 540' to the output connection line 550. If the data signal is not to be forwarded to an element in the access switch operatively coupled to the output connection line 550, the multiplexer 510 does not operatively couple the internal connection line 540' to the output connection line 550. In some embodiments, the output connection line 550 is operatively coupled to the other input connection to the multiplexer 510 when the data signal is not to be forwarded to an element in the access switch operatively coupled to the output connection line 550. In other embodiments, the output connection line 530 is not operatively coupled to either input of the multiplexer 510.

Following this example, if the data signal is to be forwarded to an element in the access switch operatively coupled to the output connection line 552, the multiplexer 512 operatively couples the internal connection line 540" to the output connection line 552. If the data signal is not to be forwarded to an element in the access switch operatively coupled to the output connection line 552, the multiplexer 512 does not operatively couple the internal connection line 540" to the output connection line 552. In some embodiments, the output connection line 552 is operatively coupled to the other input connection to the multiplexer 512 when the data signal is not to be forwarded to the element in the access switch operatively coupled to the output connection line 552. In other embodiments, the output connection line 552 is not operatively coupled to either input of the multiplexer 512. In such a manner, any input connection line 560, 562, 564 can be operatively coupled to two output connection lines 550, 552, 554. Said another way, the switch 520 allows any of the three input connection lines 560, 562, 564 to send data to two of the three output connection lines 550, 552, 554.

Figure 7:
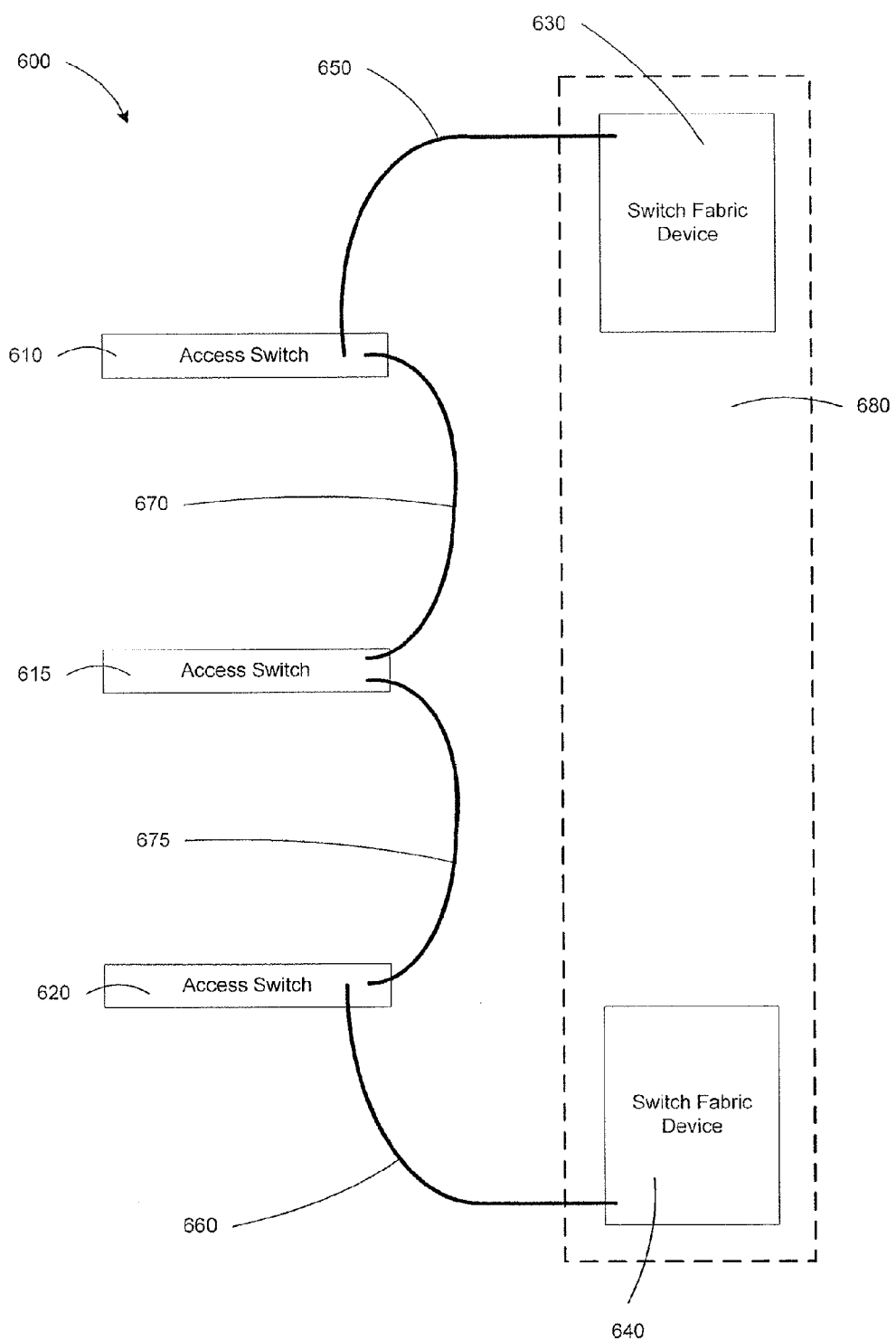
FIG. 7 is a schematic illustration of a switch fabric system, according to another embodiment.

Although the system 100 shown with respect to FIG. 1 has two access switches connected to a switch fabric, any number of access switches can be connected to the switch fabric. For example, FIG. 7 shows a system 600 that connects three access switches 610, 615, 620 to a switch fabric 680. System 600 includes a switch fabric 680, a first access switch 610, a second access switch 615, a third access switch 620, a first cable 650, a second cable 660, a third cable 670 and a fourth cable 675. The switch fabric 680 includes a first switch fabric device 630 and a second switch fabric device 640, and is structurally and functionally similar to the switch fabric 180 shown and described above.

The first access 610 can be structurally and functionally similar to the first access switch 110 shown and described above. Moreover, the second access switch 615 and the third access switch 620 are structurally and functionally similar to the first access switch 610. Therefore, the access switches 610, 615, 620 are not described in detail herein.

The first access switch 610 is coupled to the first switch fabric device 630 of the switch fabric 680 by the first cable 650. The first cable 650 can be structurally and functionally similar to the cable 200 shown and described above with reference to FIG. 2. While shown in FIG. 2 as having four strands, in other embodiments, the first cable can have any number of strands. For example, if the first cable, the second cable, the third cable and the fourth cable each have six strands, a dedicated data path can exist between each access switch and the first switch fabric device and the second switch fabric device, as described in further detail herein.

The third access switch 620 is operatively coupled to the second switch fabric device 640 by the second cable 660. The second cable 660 is structurally similar to the first cable 650. The second access switch 615 is operatively coupled to the first access switch 610 by the third cable 670 and is operatively coupled to the third access switch 620 by the fourth cable 675. The third cable 670 and the fourth cable 675 are structurally similar to the first cable 650 and are configured to carry data signals between the second access switch 615 and the first access switch 610 and data signals between the second access switch 615 and the third access switch 620, respectively.

Similar to the descriptions above, in some embodiments, the cables 650, 660, 670, 675 each include six strands configured to carry a data signal. This allows each of the access switches 610, 615, 620 to have a dedicated data path to and/or from both the first switch fabric device 630 and the second switch fabric device 640. In some embodiments, for example, a first strand of the first cable 650 and a second strand of the first cable 650 can be configured to enable the first access switch 610 to send data to and receive data from the first switch fabric device 630. Similarly, the first strand of the third cable 670, the first strand of the fourth cable 675 and the first strand of the second cable 660 can be configured to provide a dedicated data path for the first access switch 610 to send data to the second switch fabric device 640. The second strand of the third cable 670, the second strand of the fourth cable 675 and the second strand of the second cable 660 can be configured to provide a dedicated data path for the first access switch 610 to receive data from the second switch fabric device 640. In a similar manner, the third strand and the fourth strand of each cable 650, 660, 670, 675 can be configured to allow the second access switch 615 to send data to and receive data from the first switch fabric device 630 and the second switch fabric device 640. The fifth strand and the sixth strand of each cable 650, 660, 670, 675 can be configured to allow the third access switch 620 to send data to and receive data from the first switch fabric device 630 and the second switch fabric device 640. Thus, using cables 650, 660, 670, 675 having six strands, a dedicated data path can be established between three access switches.

In other embodiments, the access switches do not have a dedicated data path to the first switch fabric device and the second switch fabric device. In such embodiments, the multiplexing system shown and described with reference to FIG. 5 can be used. Specifically, the switches within the multiplexing system can be used to either route the data to a memory buffer if the data signal is being sent to the access switch, or to send the data to the next access switch if the data is being sent to one of the other access switches or a switch fabric device.

Figure 8:
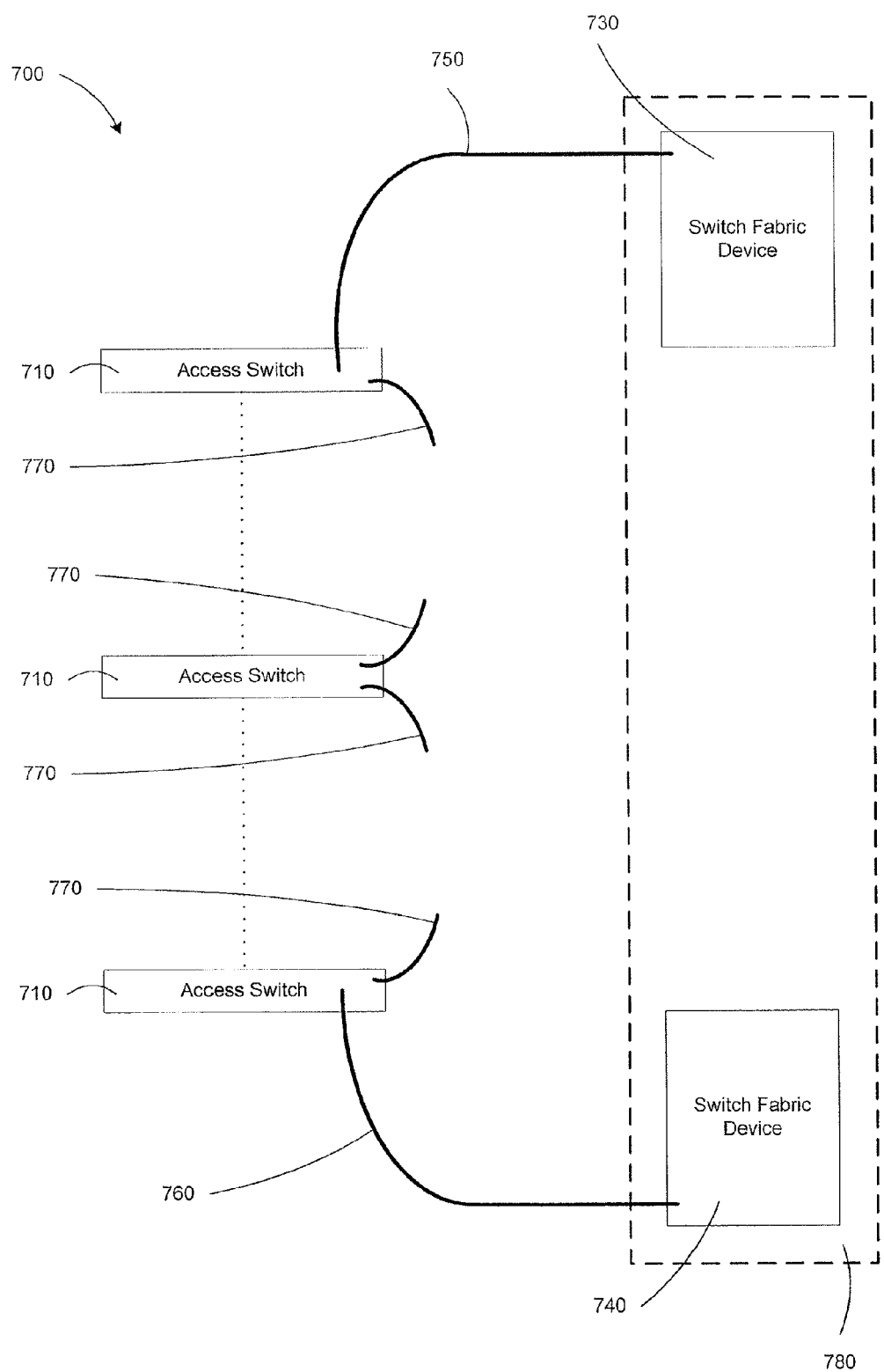
FIG. 8 is a schematic illustration of a switch fabric system, according to another embodiment.

As shown in FIG. 8, a system 700 can include any number of access switches 710 chained together by cables 770. One access switch of the access switches 710 is coupled to the first switch fabric device 730 by a cable 750 and another access switch of the access switches 710 is coupled to the second switch fabric device 740 by a cable 760. Accordingly, through these access switches, every access switch can send data signals to both the first switch fabric device 730 and the second switch fabric device 740.

In some embodiments, each access switch 710 has a dedicated data path to the first switch fabric device 730 and the second switch fabric device 740. In such an embodiment, each cable 750, 760, 770 has twice the number of strands as the number of access switches 710 chained together. For example, if the system 700 includes four access switches 710 chained together, each cable 750, 760, 770 includes eight strands. Similarly, if the system includes six access switches 710 chained together, each cable 750, 760, 770 includes twelve strands. This allows each access switch 710 to have a dedicated send and receive data path to the first switch fabric device 730 and the second switch fabric portion 740. Having a dedicated data path between each access switch 710 and the switch fabric devices 730, 740 increases the bandwidth of the system.

In other embodiments, each access switch does not have a dedicated data path but uses a multiplex system such as the system shown and described in relation to FIG. 5. In such an embodiment, each cable can include any number of strands and each access switch can use a multiplex system to control when the data is sent to and/or received from the switch fabric devices. In some embodiments, for example, if the system includes four access switches and each cable includes four strands, each access switch can use a single strand to send data to and receive data from the switch fabric devices. The multiplex systems on each of the access switches can be used to determine when the strand is sending data to and/or when the data is receiving data from the switch fabric devices. In other embodiments, the two or more access switches can share a single strand in the cables.

Figure 9:
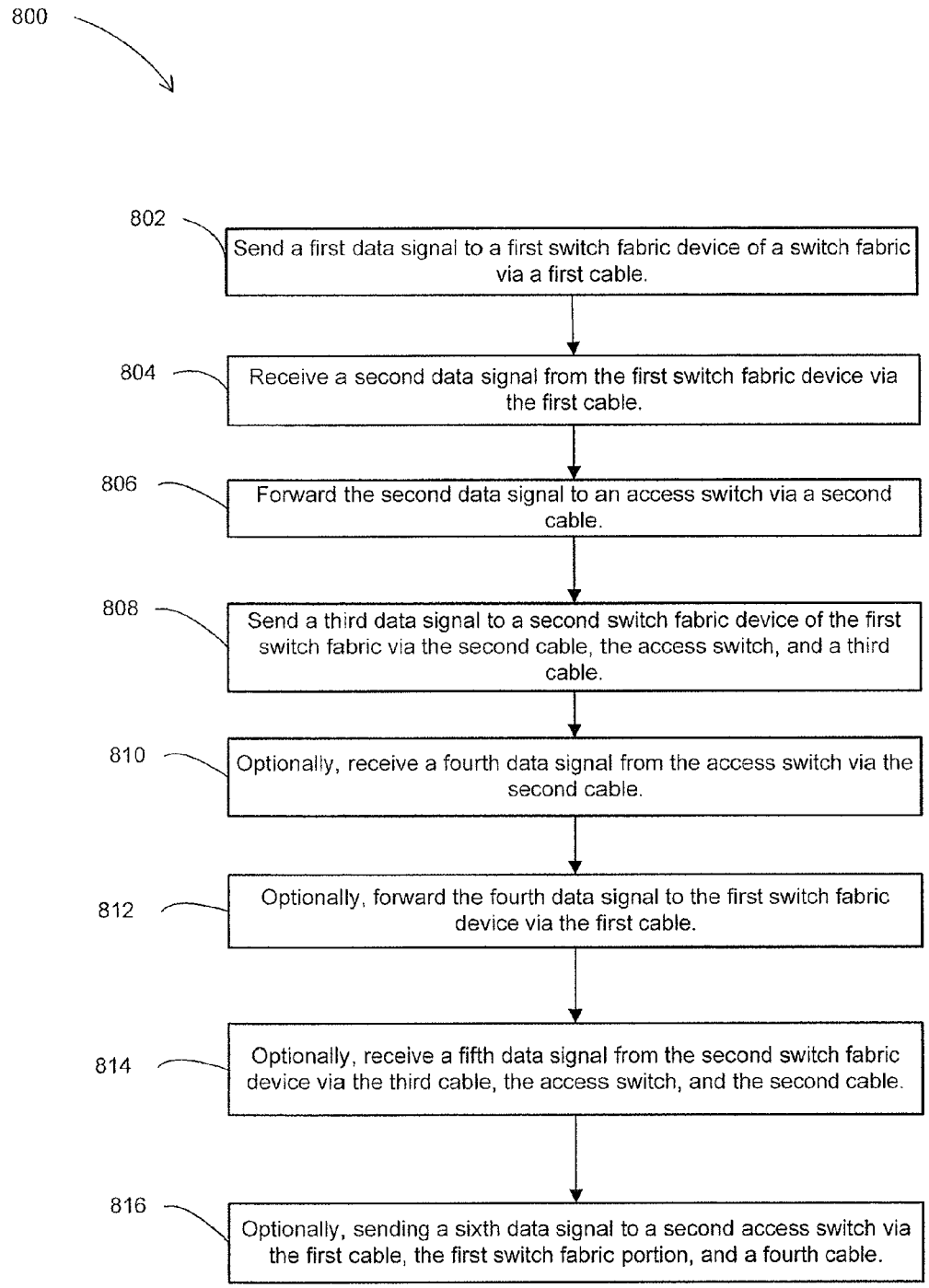
FIG. 9 is a flow chart illustrating a method for sending data signals to and receiving data signals from a switch fabric, according to another embodiment.

FIG. 9 is a flow chart illustrating a method 800 for sending data signals to and receiving data signals from a switch fabric, according to another embodiment. The method 800 includes sending a first data signal to a first switch fabric device of a switch fabric via a first cable, at 802. The first switch fabric device and the first cable can be structurally and functionally similar to the switch fabric devices and cables described herein. A second data signal is then received from the first switch fabric device via the first cable, at 804. The second data signal is then forwarded to an access switch via a second cable, at 806. The second cable can be structurally and functionally similar to the first cable. A third data signal is then sent to a second switch fabric device via the second cable, the access switch and a third cable, at 808. The second switch fabric device and the third cable can be structurally and functionally similar to the first switch fabric device and the first cable, respectively.

A fourth data signal is then optionally received from the access switch via the second cable, at 810. The fourth data signal is then optionally forwarded to the first switch fabric device via the first cable, at 812. A fifth data signal is then optionally received from the second switch fabric device via the third cable, the access switch, and the second cable, at 814. A sixth data signal is then optionally sent to a second access switch via the first cable, the first switch fabric device, and a fourth cable, at 816. The fourth cable can be structurally and functionally similar to the other cables described herein.

Figure 10:
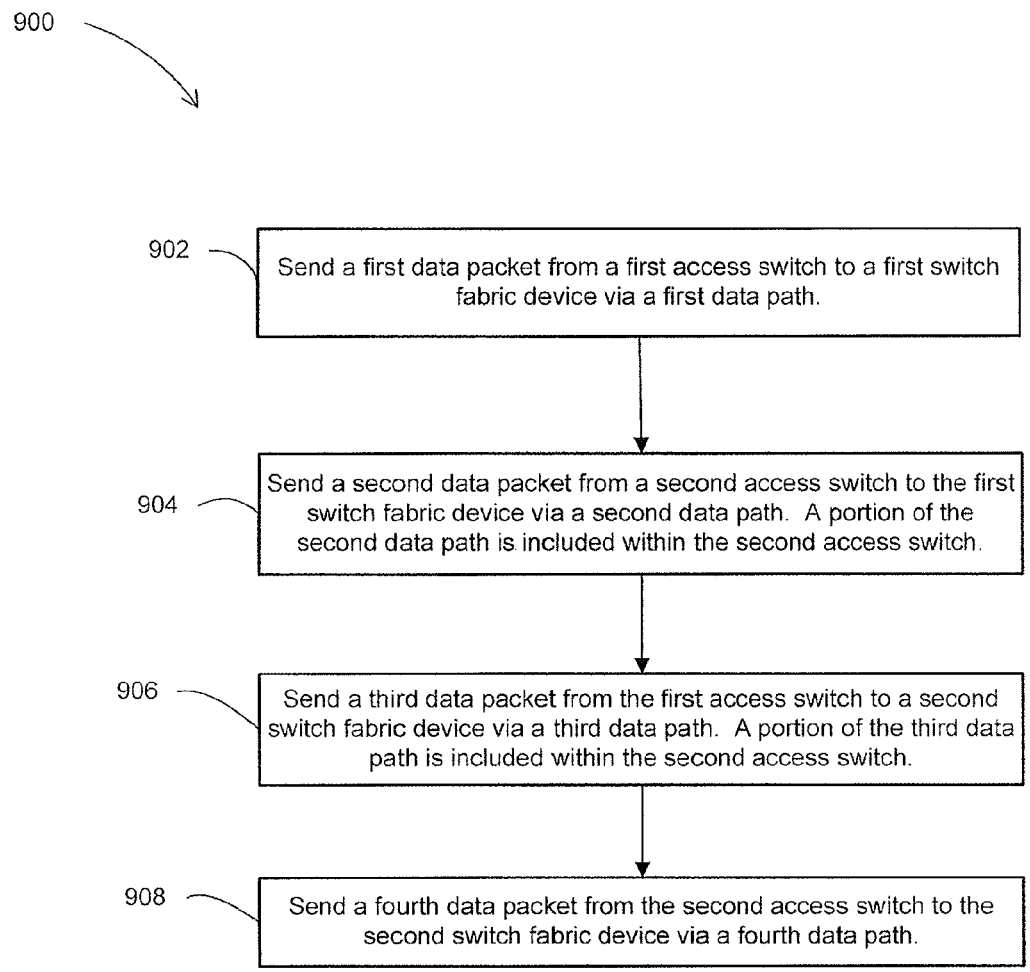
FIG. 10 is a flow chart illustrating a method for sending data signals to and receiving data signals from a switch fabric, according to another embodiment.

FIG. 10 is a flow chart illustrating a method 900 for sending data signals to and receiving data signals from a switch fabric, according to another embodiment. The method 900 includes sending a first data packet from a first access switch to a first switch fabric device via a first data path, at 902. The first access switch and the first switch fabric device can be structurally and functionally similar to the access switches and the switch fabric devices and/or switch fabrics, respectively, described herein. The first data path can include electrical traces within a chip package, optical fibers, electrical cables, and/or the like. A second data packet is then sent from a second access switch to the first switch fabric device via a second data path, at 904. A portion of the second data path is included within the second access switch. The second access switch can be structurally and functionally similar to the first access switch. The second data path can be structurally and functionally similar to the first data path.

A third data packet is then sent from the first access switch to a second switch fabric device via a third data path, at 906. A portion of the third data path is included within the second access switch. The second switch fabric device can be structurally and functionally similar to the first switch fabric device. A fourth data packet is then sent from the second access switch to the second switch fabric device via a fourth data path, at 908. The third data path and the fourth data path can be structurally and functionally similar to the first data path. In some embodiments, the first switch fabric device receives the first data packet and the third data packet at substantially the same time.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In alternate embodiments, any combination of dedicated data paths and multiplex systems can be used. In some embodiments, for example, some of the access switches in a chain of access switches have dedicated data paths to a respective switch fabric device while other access switches in the chain of access switches use multiplex systems to connect to the switch fabric device. In other embodiments, an access switch in the chain of access switches can have a dedicated data path to a first switch fabric device and use a multiplex system to connect to a second switch fabric device.

In other alternate embodiments, any number, combination and/or arrangement of switch fabric devices and access switches can be used. For example, while the access switches are shown above as being operatively coupled to at most two other access switches (e.g., access switch 615 in FIG. 7), in other embodiments, an access switch can be operatively coupled to any number of access switches. For example, an access switch can be operatively coupled to a third access switch. In some embodiments, the third access switch is operatively coupled to a switch fabric device via a direct data path. In such embodiments, a portion of the direct data path can be included within the access switch. In other embodiments, the third access switch is operatively coupled to the switch fabric device via a multiplex system included within the access switch. In still other embodiments, the third access switch can be operatively coupled to a third switch fabric device.

While the switch fabrics shown and described above each include two switch fabric devices, the switch fabrics can include any number of switch fabric devices. For example, a system can include three access switches each physically coupled to a different switch fabric device. Each access switch can be operatively coupled to the remaining switch fabric devices through the other access switches. In other embodiments, any number of access switches can be coupled to each other and included in the system having three switch fabric devices.

Although various embodiments have been described as having particular features and/or combinations of components, other embodiments are possible having a combination of any features and/or components from any of embodiments where appropriate. For example, any of the systems shown and described above can include access switches with dedicated data paths to a single and/or many switch fabric devices of a switch fabric. Further, any of the systems shown and described above can include access switches having multiplexing systems, as described above.

What is claimed is:

1. An apparatus, comprising:
a first access switch configured to be operatively coupled to a first port of a switch fabric by a first connection, the first access switch configured to be operatively coupled to a second port of the switch fabric by a dedicated data path including at least a portion of a second connection, a portion of a second access switch and a first portion of a third connection, the first access switch configured to send data to the first port via the first connection, the first access switch configured to send data to the second port via the dedicated data path such that no data sent from the first access switch to the second port of the switch fabric via the dedicated data path is modified or dropped at the second access switch,
the dedicated data path being constant between the first access switch and the second port while the first access switch is operatively coupled to the second access switch by the second connection and while the second access switch is operatively coupled to the second port by a second portion of the third connection (1) mutually exclusive from the first portion of the third connection and (2) not included in the dedicated data path.

2. The apparatus of claim 1, further comprising:
the second access switch, the second access switch configured to send data to the second port via the second portion of the third connection, the second access switch configured to send data to the first port via the second connection, the first access switch, and the first connection.

3. The apparatus of claim 1, wherein the first access switch is configured to receive data from the first port via the first connection, the first access switch configured to receive data from the second port via the first portion of the third connection, the second access switch, and the second connection.

4. The apparatus of claim 1, wherein the first access switch is configured to send data to a third access switch operatively coupled to a third port of the switch fabric via a fourth connection, the first access switch configured to send data to the third access switch via the first connection, the first port, the third port, and the fourth connection.

5. The apparatus of claim 1, wherein the first access switch is configured to be operatively coupled to a first chassis that includes the first port, the first access switch is configured to be operatively coupled to a second chassis different from the first chassis and including the second port.

6. The apparatus of claim 1, wherein the first access switch is configured to perform parsing functions or classification functions on a data packet to be sent to the first port.

7. The apparatus of claim 1, further comprising:
the second access switch, the second access switch configured to send data to the second port via the second portion of the third connection.

8. The apparatus of claim 1, wherein the dedicated data path is a first dedicated data path, the portion of the second connection included in the first dedicated data path is less than an entirety of the second connection, the first access switch includes a portion of a second dedicated data path connecting the second access switch and the first port, the second dedicated data path including a first portion of the first connection, the first access switch configured to send data to the first port via a second portion of the first connection mutually exclusive from the first portion of the first connection.

9. An apparatus, comprising:
a first access switch configured to be physically coupled to a second access switch without an intervening switch device, the first access switch configured to be physically coupled to a third access switch without an intervening switch device, the first access switch configured to send data to a first port of a distributed switch fabric via the second access switch, the first access switch configured to send data to a second port of the distributed switch fabric via a dedicated data path including at least a portion in the third access switch and a first portion of a connection and such that no data packet sent from the first access switch to the second port of the distributed switch fabric via the dedicated data path is modified or dropped at the third access switch,
the dedicated data path being constant between the first access switch and the second port while (1) the first access switch is physically coupled to the third access switch without an intervening switch device, and (2) the third access switch is physically coupled, without an intervening switch device, to the second port by a second portion of the connection mutually exclusive from the first portion of the connection and not included in the dedicated data path.

10. The apparatus of claim 9, wherein the first access switch is configured to send data received from the second access switch to the second port via the third access switch, the first access switch configured to send data received from the third access switch to the first port via the second access switch.

11. The apparatus of claim 9, wherein the dedicated data path is a first dedicated data path, the first access switch includes a portion of a second dedicated data path connecting the second access switch and the second port of the distributed switch fabric, the second dedicated data path including a portion in the third access switch, when (1) the first access switch is physically coupled to the third access switch without an intervening switch device, and (2) the third access switch is physically coupled to the second port of the distributed switch fabric without an intervening switch device, and (3) the first access switch is physically coupled to the second access switch without an intervening switch device.

12. The apparatus of claim 9, wherein the first access switch is configured to be disposed within a chassis different than a chassis of the second access switch and a chassis of the third access switch.

13. The apparatus of claim 9, wherein the connection is a first connection, the first access switch is configured to be physically coupled to the third access switch by a second connection, the dedicated data path including a first portion of the second connection, the first access switch configured to send data to the third access switch via a second portion of the second connection mutually exclusive from the first portion of the second connection.

* * * * *